(12) United States Patent
Segev et al.

(10) Patent No.: US 8,166,170 B2
(45) Date of Patent: Apr. 24, 2012

(54) DISTRIBUTED MULTIPLEXING

(75) Inventors: Doron Segev, Tel-Aviv (IL); Ron Gutman, San Diego, CA (US); Lior Morad, Modiin (IL)

(73) Assignee: Imagine Communications Ltd., Netanya (IL)

( * ) Notice: Subject to any disclaimer, the term of this patent is extended or adjusted under 35 U.S.C. 154(b) by 250 days.

(21) Appl. No.: 12/589,690

(22) Filed: Oct. 26, 2009

(65) Prior Publication Data

US 2010/0106838 A1    Apr. 29, 2010

Related U.S. Application Data

(60) Provisional application No. 61/108,514, filed on Oct. 26, 2008.

(51) Int. Cl.
*G06F 15/16* (2006.01)
*G06F 15/173* (2006.01)

(52) U.S. Cl. ........ 709/226; 709/231; 370/458; 370/464; 370/468; 370/498; 370/508; 370/230; 375/240.05; 375/240.02; 375/240.03; 375/240.07; 375/240.16; 375/240.26; 375/E07.078; 725/116; 725/117; 725/146; 725/95; 725/96; 725/105; 725/135; 725/143

(58) Field of Classification Search .................. 709/226, 709/231; 370/458, 464, 468, 498, 508, 230; 375/240.05, 240.02, 240.03, 240.07, 240.16, 375/240.26, E07.078; 725/116, 146, 117, 725/95, 96, 105, 135, 143
See application file for complete search history.

(56) References Cited

U.S. PATENT DOCUMENTS

| | | | |
|---|---|---|---|
| 5,603,058 A * | 2/1997 | Belknap et al. | 710/35 |
| 6,052,384 A * | 4/2000 | Huang et al. | 370/468 |
| 6,081,295 A | 6/2000 | Adolph et al. | |
| 6,195,388 B1 * | 2/2001 | Choi et al. | 375/240.05 |
| 6,215,824 B1 | 4/2001 | Assuncao | |
| 6,279,158 B1 * | 8/2001 | Geile et al. | 725/126 |
| 6,310,915 B1 * | 10/2001 | Wells et al. | 375/240.03 |
| 6,359,863 B1 * | 3/2002 | Varma et al. | 370/232 |
| 6,438,139 B1 * | 8/2002 | Huang et al. | 370/468 |
| 6,516,002 B1 * | 2/2003 | Huang et al. | 370/468 |
| 6,570,888 B1 * | 5/2003 | Huang et al. | 370/468 |
| 6,795,506 B1 * | 9/2004 | Zhang et al. | 375/240.26 |
| 6,850,965 B2 * | 2/2005 | Allen | 709/203 |
| 7,009,997 B2 * | 3/2006 | Huang et al. | 370/468 |
| 7,058,087 B1 | 6/2006 | Oz et al. | |
| 7,058,677 B1 | 6/2006 | Laksono et al. | |

(Continued)

OTHER PUBLICATIONS

Harmonic: Narrowcast Services Gateway™ NSG™ 9116; 2 pages; © Harmonic Inc.; Jun. 2007; downloaded from http://www.harmonicinc.com/view_collateral.cfm?ID=1346.

(Continued)

*Primary Examiner* — Khanh Dinh
*Assistant Examiner* — Saket K Daftuar
(74) *Attorney, Agent, or Firm* — D. Kligler IP Services Ltd.

(57) ABSTRACT

The present invention is directed to a method of delivering a video stream. The method operates by determining a group of video streams to be provided to a particular destination over a particular communication link. Next, the band width of the link is allocated to the video streams based upon the particular properties of the various video streams to be transmitted. The video streams are processed so that they fit into the band width allocations. Next, the video streams are transmitted in separate channels, synchronized with respect to each other, to reach the subject destination.

18 Claims, 2 Drawing Sheets

U.S. PATENT DOCUMENTS

| | | | |
|---|---|---|---|
| 7,174,385 B2 * | 2/2007 | Li | 709/231 |
| 7,266,133 B2 * | 9/2007 | Wu et al. | 370/539 |
| 7,292,602 B1 * | 11/2007 | Liu et al. | 370/468 |
| 7,346,688 B2 * | 3/2008 | Allen | 709/226 |
| 7,383,338 B2 * | 6/2008 | Allen | 709/226 |
| 7,529,276 B1 * | 5/2009 | Ramakrishnan | 370/516 |
| 7,590,200 B2 * | 9/2009 | Fujii et al. | 375/347 |
| 7,793,329 B2 * | 9/2010 | Joshi et al. | 725/120 |
| 7,809,853 B1 * | 10/2010 | Clark et al. | 709/234 |
| 7,849,194 B2 * | 12/2010 | Horen et al. | 709/226 |
| 7,890,631 B2 * | 2/2011 | Allen | 709/226 |
| 7,936,675 B2 * | 5/2011 | Bailey et al. | 370/232 |
| 2001/0022789 A1 * | 9/2001 | Huang et al. | 370/468 |
| 2002/0018477 A1 * | 2/2002 | Katz | 370/401 |
| 2002/0029274 A1 * | 3/2002 | Allen | 709/226 |
| 2005/0058200 A1 * | 3/2005 | Lu et al. | 375/240.12 |
| 2006/0195881 A1 | 8/2006 | Segev et al. | |
| 2006/0218281 A1 * | 9/2006 | Allen | 709/226 |
| 2006/0224762 A1 * | 10/2006 | Tian et al. | 709/231 |
| 2006/0224768 A1 * | 10/2006 | Allen | 709/234 |
| 2006/0265512 A1 * | 11/2006 | Allen | 709/231 |
| 2007/0165524 A1 * | 7/2007 | Mascolo | 370/230 |
| 2007/0200948 A1 * | 8/2007 | Kim et al. | 348/385.1 |
| 2008/0130501 A1 * | 6/2008 | Bailey et al. | 370/235 |
| 2008/0228921 A1 * | 9/2008 | Allen | 709/226 |
| 2009/0028192 A1 * | 1/2009 | Rieger et al. | 370/535 |
| 2009/0177793 A1 * | 7/2009 | Josa et al. | 709/231 |

OTHER PUBLICATIONS

Test Model 5, MPEG-2 Video Main Profile; downloaded from http://www.mpeg.org/MPEG/MSSG/tm5/, Oct. 22, 2009.

\* cited by examiner

# DISTRIBUTED MULTIPLEXING

PRIORITY INFORMATION

The present invention claims priority to U.S. Provisional Application No. 61/108,514 filed on Oct. 26, 2008, making reference to same in its entirety.

FIELD OF THE INVENTION

The present invention relates to communication systems and in particular to systems for the delivery of video signals.

BACKGROUND OF THE INVENTION

One of the uses of communication networks, such as cable television, the Internet and the like, is for the distribution of movies and/or other video programs in the form of video streams. Video streams are formed from a sequence of discrete images referred to as frames, with corresponding display times. The transmission of video streams requires wide bandwidth and therefore video streams are generally compressed before transmission. For a given quality level, some video frames (e.g., frames having a large amount of detail) can be compressed only to a small extent, while other video frames (e.g., frames merely showing a blue sky) can be compressed to a larger extent, without substantial loss of quality. Therefore, many video compression methods provide variable bit-rate (VBR) video streams, in which different frames are compressed by different amounts.

Handling VBR video streams is somewhat inconvenient in that at different times different amounts of data are managed. Consequently, some protocols, such as the MPEG-2 transport stream (TS) protocol, handle only constant bit rate video channels. When a single VBR stream is to be handled, the VBR stream is encapsulated in a constant bit rate video channel, with padding bits, such as null transport stream packets of the MPEG-2 TS protocol, or other data unrelated to the video stream, filling the gaps between the VBR stream and the constant bit rate channel.

When a plurality of video streams are delivered together to a single location, the combined size of the encapsulating channels of the video streams may be substantially greater than the combined size of the video streams. Statistical multiplexers are designed to combine a plurality of VBR video streams onto a single channel, taking advantage of the fact that different video streams statistically require momentary high bit rates at different times. Statistical multiplexers also generally compress one or more of the multiplexed video streams when required and/or slightly change the timing of frames to enhance the multiplexing process.

U.S. Pat. No. 6,195,388 to Choi et al., the disclosure of which is incorporated herein by reference in its entirety, describes a statistical multiplexer.

U.S. Pat. No. 7,266,133 to Wu et al., the disclosure of which is incorporated herein by reference in its entirety, suggests a two stage statistical multiplexer, for cases in which large numbers of streams need to be multiplexed together.

Since statistical multiplexers are relatively complex, there have been various attempts to reduce their work load so that they can be made simpler.

US patent publication 2006/0195881 to Segev et al., the disclosure of which is incorporated herein by reference in its entirety, suggests generating compressed replacement blocks in advance for blocks of the video stream. When necessary, the statistical multiplexer uses these pre-prepared blocks instead of recompressing the blocks of the stream. This publication further describes performing statistical multiplexing of a channel, by software running on a processor not designed specifically for statistical multiplexing (e.g., not including a dedicated ASIC or FPGA).

In video on demand (VoD) cable television systems, video streams are generally provided to subscribers using quadrature amplitude modulation (QAM). The video streams are stored on VoD servers which transmit them to QAM modulators servicing clients on demand. The stored and transmitted video streams are generally CBR streams, which are easier to handle. The QAM modulator receives and modulates the stream and transmits it to the receiver, where a QAM tuner demodulates the stream and displays it on a television set. Some QAM modulators, such as the NSG 9116 Edge QAM, described for example at http://www.harmonicinc.com/view-_collateral.cfm?ID=1346, are adapted to receive a plurality of single or multiple program channels and to combine them into a single channel, prior to modulation. The QAM modulator, however, usually does not perform statistical multiplexing, as such a function would make the modulator very complex. Instead, the QAM simply takes the CBR streams and combines them to generate a multi-program CBR stream having a size which is a sum of its CBR components. This simplicity is achieved at the expense of not using statistical multiplexing.

SUMMARY OF THE INVENTION

An aspect of some embodiments of the present invention relates to synchronizing the sizes and/or data transmission timing of a plurality of VBR video streams delivered in separate channels, optionally single program transport stream (SPTS) channels, to a receiving unit, such that combining the channels results in a single multi-program transport stream (MPTS) channel that is substantially smaller than the aggregate size of the separate channels, while still including the plurality of video streams. Optionally, the combining of the channels is performed without time-shifting and/or recompressing the data of the stream. The synchronizing of the streams although they are transmitted separately, allows simple combining of the streams at a different location, without forgoing the flexibility of separate delivery of the streams within the network.

There is therefore provided in accordance with an exemplary embodiment of the invention, a method of delivering a video stream, comprising determining a group of video streams to be provided together to a destination over a communication link of a specific size; allocating bandwidth to the streams of the group, responsive to the size of the communication link and properties of the video streams of the group processing the video streams so that they fit into their respective bandwidth allocations; and transmitting the processed video streams in separate channels, synchronized relative to each other, toward the destination.

Optionally, the communication link of the specific size has a constant size. Alternatively, the communication link of the specific size has a size which varies over time.

Optionally, allocating bandwidth to the streams comprises allocating bandwidth separately for a plurality of time segments. Optionally, allocating bandwidth to the streams comprises allocating for each time segment responsive to an analysis of the image content of the video streams during or around the time segment for which the allocation is performed.

Optionally, transmitting the processed video streams in separate channels comprises transmitting at times corresponding to the relative times of the time segments in the streams.

Optionally, allocating bandwidth to the streams comprises allocating in a manner designed to achieve substantially equal quality of the streams in each time segment.

Optionally, allocating bandwidth to the streams comprises allocating responsive to meta data describing properties of the video streams.

Optionally, processing the video streams comprises processing at least two of the streams by different or separate processing units. Optionally, the processing units are distanced from each other by at least one kilometer. Optionally, the different processing units are located within less than 50 meters from each other. Optionally, transmitting the processed video streams in separate channels comprises transmitting in separate constant bit rate channels or in separate variable bit rate channels. Optionally, the sum of the maximal sizes over time of the separate channels is greater from the size of the destination channel by at least 10%.

Optionally, transmitting the processed video streams in separate channels comprises transmitting in separate TS channels. Optionally, transmitting the processed video streams in separate channels comprises transmitting with different transport layer classifiers. Optionally, the method includes combining the processed video streams from the separate channels onto the communication link by a QAM modulator, without re-encoding the streams.

Optionally, the determined group of video streams comprises at least one real time video stream. Optionally, processing the video streams so that they fit into their respective bandwidth allocations is performed by one or more hardware units which serve as a source of the stream. Optionally, processing the video streams so that they fit into their respective bandwidth allocations is performed by a first hardware unit separate from one or more second hardware units which serve as sources of the streams. Optionally, processing the video streams so that they fit into their respective bandwidth allocations comprises processing such that the peak bit rate of the sum of the processed video streams is at least 10% smaller than the sum of the peak bit rates of the determined video streams before they are processed.

There is further provided in accordance with an exemplary embodiment of the invention, rate adapter, comprising an input interface adapted to receive a plurality of video streams, a bandwidth allocator configured to allocate bandwidth to the plurality of video streams in a manner which allows transmission of the plurality of video streams on a communication link of a given size and a video processing unit configured to receive bandwidth allocations for the plurality of video streams from the bandwidth allocator, to process the video streams, if necessary, so that they fit in their allocated bandwidth and to forward the streams, synchronized relative to each other, in separate channels.

Optionally, the bandwidth allocator is adapted to allocate bandwidth for the streams in advance for the entire duration of the video streams. Alternatively, the bandwidth allocator is adapted to allocate bandwidth periodically for an upcoming time segment of the video stream.

BRIEF DESCRIPTION OF THE FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Network Overview

Figure 1:
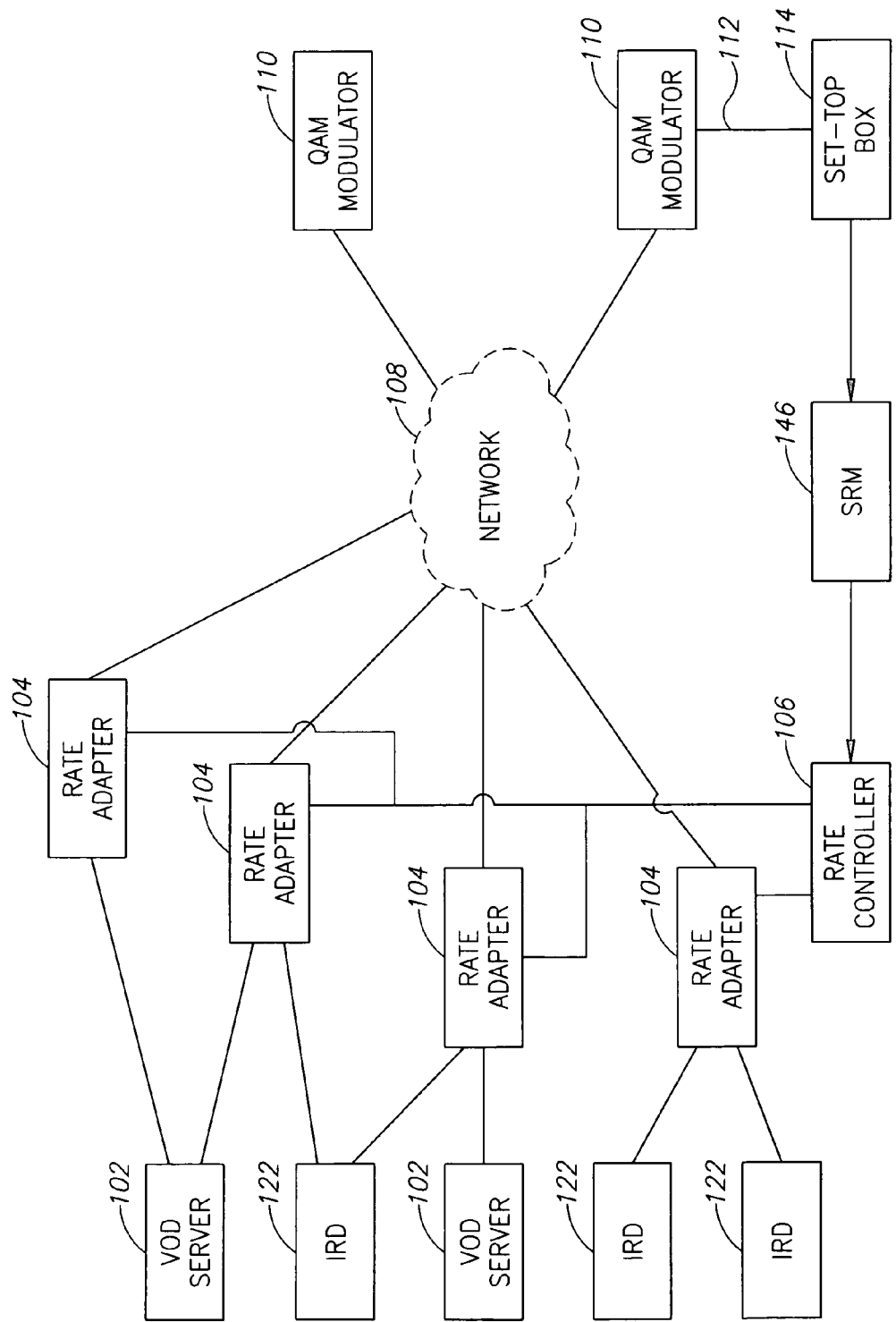
FIG. 1 is a schematic illustration of a video delivery system, in accordance with an exemplary embodiment of the invention.

FIG. 1 is a schematic illustration of a video delivery system 100, in accordance with an exemplary embodiment of the invention. System 100 includes a plurality of video on demand (VoD) servers 102, which store video streams and provide them to subscribers, and/or one or more real time video sources, such as Integrated Receiver Decoders (IRD) 122. The output of each VoD server 102 and/or each IRD 122 may feed into one or more rate adapters 104 which adjust the rate of the video stream, according to instructions from a rate controller 106. Rate controller 106 is optionally configured with the identities of a group of streams that are to be delivered together to a client and a channel size allocated for the delivery of the group of streams to the client. The rate controller 106 receives information regarding the streams and/or the streams themselves and accordingly determines how to allocate the channel size to the different streams within the group.

It is noted that a single rate adapter 104 may handle a single video stream or a plurality of video streams. In addition, a single video stream may belong to a plurality of different groups of streams transmitted on separate links to separate end-users, and in such cases the stream is rate adapted into a plurality of different channels, by either a single rate adapter 104 or by a plurality of different rate adapters. Similarly, rate controller 106 may be configured to handle fitting a single group of streams on one channel, or handle concurrently fitting a plurality of groups of streams into a plurality of respective channel sizes.

It is noted that two different groups may include a common video stream and rate controller 106 may allocate different bandwidth allocations to the video stream at the same time, for the different groups. Optionally, rate controller 106 is dynamically instructed as to which groups it is to handle. In some embodiments, a session resource manager (SRM) 146 receives requests from clients for delivery of video streams and accordingly provides rate controller 106 with instructions regarding the groups it is to handle.

The rate adapted streams from rate adapters 104 are transmitted through a network 108 as separate single program transport streams (SPTS) to a QAM modulator 110, which optionally combines the streams, modulates the combination and transmits the modulated stream via a hybrid fiber-coax (HFC) link 112, or any other suitable link, toward a set-top box 114, or other client. The combining of the streams by QAM modulator 110 is a simple procedure, as the streams were previously rate adapted to fit with each other onto a channel having the bandwidth of link 112, or of that portion of link 112 allocated to the group of streams. In the combining of the streams, QAM modulator 110 optionally does not perform statistical multiplexing tasks, such as block replacements, timing adjustments or recompression. QAM modulator 110 may be a standard modulator which is unaware of the operation of rate adapters 104, such that embodiments of the invention can be implemented without replacing QAM modulators 110.

Real time video streams are generated shortly before they are handled by their respective one or more rate adapters 104, generally less than 5 minutes, but perhaps less than 10 seconds or even less than 5 seconds from when they were generated.

Servers and Rate Adapters

Servers 102 may all be located next to each other or some or all of the servers 102 may be distanced from each other, possibly being separated by more than 100 meters, more than a kilometer or even more than 10 kilometers.

Rate adapters 104 are optionally separate units from servers 102. In an exemplary embodiment, an existing video delivery system including servers 102 and QAM modulator 110 is upgraded by adding rate adapters 104 and rate controller 106, without altering servers 102 and/or QAM modulator 110. Optionally, before the adding of rate adapters 104 and rate controller 106, streams are transmitted to QAM modulator 110 as constant bit rate (CBR) streams or as non-correlated VBR streams having a size defined by a bounding fixed rate channel. Modulator 110 combines the streams into a combined stream having a size equal to the sum of the sizes of the bounding fixed rate channels. After the video delivery system is upgraded by adding rate adapters 104 and rate controller 106, the streams are provided as size synchronized variable bit rate (VBR) streams in separate channels, which are combined by QAM modulator 110 into a single multistream channel that is smaller than the sum of the bounding sizes of the channels that are combined. Due to the rate adjustment, the number of streams delivered to QAM modulator 110 after adding rate adapters 104 is optionally at least 20% or even at least 40% more than prior to the addition, while retaining a similar quality.

Alternatively to using rate adapters 104 separate from servers 102, some or all of servers 102 may be adapted to perform the rate adjustment, responsive to instructions from controller 106, during or after generation of the stream.

Rate adapters 104 optionally perform the rate adaptation by recompressing blocks of the video stream that are larger than the bandwidth allocated for them by rate controller 106. The recompression may be performed using substantially any method known in the art. In some embodiments of the invention, rate adapter 104 receives for some blocks of the video stream (e.g., macroblocks, frames, GOPs) of the video stream, a plurality of blocks representing the frame at different compression levels, and selects one of the blocks according to the allocated bandwidth. This may be performed, for example, using any of the methods described in above mentioned US patent publication 2006/0195881 to Segev et al. Alternatively or additionally, the rate adaptation includes shifting one or more blocks backwards in the timeline of the video stream such that they are transmitted slightly before they are required, at a time in which other video streams within the same group have lower bandwidth requirements.

It is noted, however, that in some cases, no rate adaptation is required, since the received video stream fits onto the allocated bandwidth without size adaptation. In such cases, the processing of the video stream by the rate adapter may consist of merely adding or removing null filler bits or even merely transferring the input of the rate adapter to its output port.

Rate Controller

Rate controller 106 may operate using any method for allocating bandwidth that is known in the art. In some embodiments of the invention, rate controller 106 periodically receives meta-data on each of the streams in a group of streams which are to be size synchronized and accordingly, for each time segment, assigns a portion of the available bandwidth to each of the streams. The allocation is optionally based on an attempt to achieve equal quality for all the streams of the group, for example using methods described in U.S. patent application Ser. No. 12/152,814, titled "Quality Based Video Encoding", filed May 16, 2008, the disclosure of which is incorporated herein by reference in its entirety. Alternatively or additionally, other stream synchronization methods are used, such as the Test Model 5 method described in http://www.mpeg.org/MPEG/MSSG/tm5/, the disclosure of which is incorporated herein by reference.

The size of the time segments for which rate controller 106 periodically provides bandwidth allocations to rate adapters 104, may be defined, for example, in terms of a video portion length or in terms of a time period. For example, for each video stream in the handled group rate controller 106 may provide an indication of the bandwidth it is to use for a next time period. Alternatively or additionally, rate controller 106 provides indications of a bandwidth to be used for a next given portion of the video stream, such as the next GOP or frame. Optionally, in these embodiments, each bandwidth allocation relates to at least the length of a group of pictures (GOP) or even several GOPs. Alternatively, the allocations relate to shorter portions, for example for a single frame or even for durations shorter than a single frame. While the bandwidth allocation may be performed repeatedly for periods of the same length, this is not mandatory, and the allocation may be performed at different times for segments of different lengths.

In some embodiments of the invention, when dealing with non-real-time streams, instead of separately providing bandwidth allocations for each time segment slightly before that time segment, bandwidth allocations are provided at once for a plurality of time segments. Possibly, rate controller 106 provides bandwidth allocations in advance for an entire video stream or for a substantial portion thereof, e.g., at least 10% or even 20% of the stream.

Alternatively to using a rate controller 106 to perform the bandwidth allocation, the allocation is performed in a distributed manner by the rate adapters 104. In some such embodiments, the rate adapters 104 dynamically select one of them to serve as the rate controller for each given group of streams to be transmitted to a specific client. Alternatively, each rate adapter 104 determines on its own the bandwidth allocation it is to use, based on a predetermined distributed algorithm. Optionally, in accordance with this alternative, the meta-data of the streams of the groups is sent to all the rate adapters 104 participating in handling streams of the group and accordingly the rate adapters determine the allocations of the streams they handle, possibly as a result of determining the allocations of all the streams of the group.

The bandwidth allocation optionally provides equal service to all the streams, for example being directed at achieving equal quality degradation for all the streams and/or equal average bandwidth amounts. Alternatively or additionally, the video streams are associated with quality of service (QoS) ratings and their bandwidth allocations depend on their QoS ratings. In some embodiments of the invention, one or more of the video streams in the group may be classified as a high priority stream which is not to be degraded or altered at all. Such streams are passed through rate adapters 104 without alterations; the remaining streams of the groups receiving bandwidth allocations according to the bandwidth remaining after the high priority stream is allocated its bandwidth. As other streams received by rate adapters 104, the high priority streams may be CBR or VBR streams.

Channels

As mentioned above, the video streams of a correlated group of streams are transmitted to QAM modulator 110 in a plurality of separate channels. Optionally, each video stream is transmitted from its rate adapter 104 in a separate channel, although two or more video streams may be transmitted together in a single channel, for example when these video streams are always supplied together. Each channel is optionally identified by a separate and unique channel classifier (e.g., a unique header). The different channels optionally have different control signals. For example, the channels may be transmitted on separate physical/link layer interfaces (e.g., separate Ethernet interfaces) and/or with separate transport layer (e.g., IP, UDP) address and/or port identifiers. In an exemplary embodiment of the invention, the channels are transmitted according to the MPEG-2 transport stream (TS) protocol. In such embodiments, each channel containing a video stream is optionally transmitted as a separate TS stream having a unique channel ID.

The streams of the correlated group of streams are not necessarily provided from a single server and even not necessarily from a single location. Thus, they do not necessarily have the same source network layer address, e.g., IP address.

In some embodiments of the invention, each video stream of the correlated group is transmitted from its server 102 to QAM modulator 110 on a separate constant bit rate (CBR) channel, adhering to CBR timing constraints, such as those of the MPEG-2 transport stream protocol. For example, if the streams are originally VBR streams, they are optionally encased in CBR streams with padding bits. The total size of the CBR channels provided to QAM modulator 110 is optionally substantially greater than the maximal size of the combination of all the rate adjusted streams, for example at least 20% or even at least 30% greater. Transmitting the rate adjusted channels to QAM modulator 110 in separate CBR channels makes the delivery of the streams simple and easy, while still allowing simple combination of the streams into a suitable size, by QAM modulator 110.

In some embodiments of the invention, the video streams are transmitted to QAM modulator 110 in a synchronized manner, such that the segments of the video streams are transmitted according to their relative times in the streams. Accordingly, if the entire bandwidth of link 112 is utilized by the group of streams, the amount of data belonging to the group transmitted toward QAM modulator 110 during each time segment would be substantially equal to the size of the link 112. Optionally, the transmitted segments of the video streams are received by QAM 110 according to the relative timing of the segments of the video streams. Optionally, the jitter in the transmission of the segments is smaller than a given value, for example less than 50 milliseconds or even less than 10 milliseconds.

In other embodiments, QAM modulator 110 has a large buffer and/or a large buffer is provided before QAM modulator 110, and stream portions may be transmitted in advance and buffered, before modulator 110 organizes the data for transmission.

Figure 2:
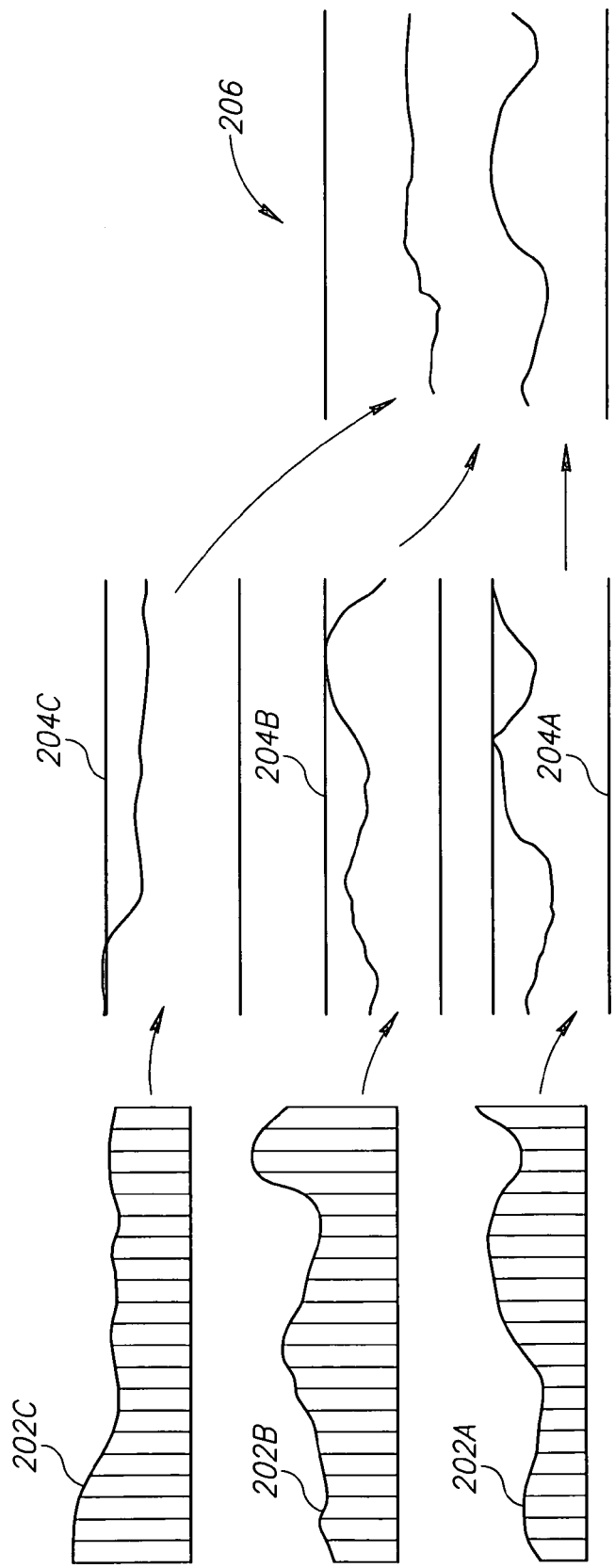
FIG. 2 is a schematic illustration of video streams before and after they are combined, in accordance with an exemplary embodiment of the invention.

FIG. 2 is a schematic illustration of three video channels generated by one or more rate adapters 104 (FIG. 1), in accordance with an exemplary embodiment of the invention. Based on allocation instructions from rate controller 106, three streams 202A, 202B and 202C are generated by one or more rate adapters 104. Each stream 202A-C is packed into a respective CBR channel 204 (marked 204A, 204B and 204C) and is transmitted separately to QAM modulator 110. QAM modulator 110 extracts the video streams 202A-C from channels 204 and combines them onto a single combined stream 206.

The padding of the VBR stream into a CBR stream may include null bits which do not carry information, such as null MPEG-2 transport stream TS packets, or may include packets including additional information beyond that included in the VBR stream, such as packets with additional content, quality enhancement packets and/or packets which aid in further handling of the VBR stream.

Alternatively to transmitting the streams in CBR channels, one or more of the streams is provided as a VBR stream without padding into a CBR stream.

The video stream is optionally transmitted in accordance with any suitable video encapsulation format, such as MP-4, AVI, FLV or mpeg-2 TS, and/or using any suitable video coding, such as h.264, VP6 or VC-1. In some embodiments of the invention, the video streams are transmitted in accordance with the Real-Time Protocol (RTP). Although the above description relates to video streams, the principles of the present invention may be applied to audio streams (e.g., high quality audio streams) and/or other data types.

End Remarks

It will be appreciated that the methods described hereinabove may be varied in many ways, including, changing the order of some of the steps, and/or performing a plurality of steps concurrently. It should also be appreciated that the above described description of methods and apparatus are to be interpreted as including apparatus for carrying out the methods and methods of using the apparatus.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, within the claims, the terms "comprise," "include," "have" and their conjugates, mean, "including but not necessarily limited to."

It is noted that some of the above described embodiments may describe the best mode contemplated by the inventors and therefore may include structure, acts or details of structures and acts that may not be essential to the invention and which are described by way of example only. Structure and acts described herein are replaceable by equivalents which perform the same function, even if the structure or acts are different, as known in the art. Therefore, the scope of the invention is limited only by the elements and limitations as used in the claims.

We claim:

1. A method of delivering a video stream, comprising:
   determining a group of video streams to be provided together to a destination over a communication link of a specific bandwidth size;
   allocating bandwidth to the video streams of the group, responsive to the bandwidth size of the communication link and properties of the video streams of the group;
   processing the video streams, by one or more processors, so that they fit into their respective bandwidth allocations; and
   transmitting the processed video streams in separate constant bit rate channels, synchronized relative to each other, toward the destination, wherein a sum of maximal bandwidth sizes over time of the separate channels exceeds the bandwidth size of the communication link of the specific bandwidth size by at least 10%.

2. A method according to claim 1, wherein the communication link of the specific bandwidth size has a constant bandwidth size.

3. A method according to claim 1, wherein the communication link of the specific bandwidth size has a bandwidth size which varies over time.

4. A method according to claim 1, wherein allocating bandwidth to the video streams comprises allocating bandwidth separately for a plurality of time segments.

5. A method according to claim 4, wherein allocating bandwidth to the video streams comprises allocating for each time segment responsive to an analysis of the image content of the video streams during or around the time segment for which the allocation is performed.

6. A method according to claim 4, wherein transmitting the processed video streams in separate channels comprises transmitting at times corresponding to the relative times of the time segments within the video streams.

7. A method according to claim 4, wherein allocating bandwidth to the video streams comprises allocating in a manner designed to achieve substantially equal quality of the video streams in each time segment.

8. A method according to claim 1, wherein allocating bandwidth to the video streams comprises allocating responsive to meta data describing properties of the video streams.

9. A method according to claim 1, wherein processing the video streams comprises processing at least two of the video streams by separate processing units.

10. A method according to claim 9, wherein the separate processing units are distanced from each other by at least one kilometer.

11. A method according to claim 9, wherein the separate processing units are located within 50 meters of each other.

12. A method according to claim 1, wherein transmitting the processed video streams in separate channels comprises transmitting in separate TS channels.

13. A method according to claim 1, wherein transmitting the processed video streams in separate channels comprises transmitting with different transport layer classifiers.

14. A method according to claim 1, comprising combining the processed video streams from the separate channels onto the communication link by a QAM modulator, without re-encoding the video streams.

15. A method according to claim 1, wherein the determined group of video streams comprises at least one real time video stream.

16. A method according to claim 1, wherein processing the video streams so that they fit into their respective bandwidth allocations is performed by one or more hardware units which serve as a source of the video stream.

17. A method according to claim 1, wherein processing the video streams so that they fit into their respective bandwidth allocations comprises processing such that the peak bit rate of a sum of the processed video streams is at least 10% less than the sum of the peak bit rates of the determined video streams prior to processing.

18. A method according to claim 1, wherein processing the video streams so that they fit into their respective bandwidth allocations is performed by a first hardware unit separate from one or more second hardware units which serve as sources of the video streams.

* * * * *